United States Patent
Nazemi et al.

(10) Patent No.: US 10,203,414 B2
(45) Date of Patent: Feb. 12, 2019

(54) SYSTEM AND METHOD OF TRACKING MULTIPLE TARGETS DESIGNATED BY PULSE-CODED LASERS

(71) Applicant: Sensors Unlimited, Inc., Princeton, NJ (US)

(72) Inventors: Jonathan Nazemi, Doylestown, PA (US); Andrew Eckhardt, Richboro, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 465 days.

(21) Appl. No.: 14/955,775

(22) Filed: Dec. 1, 2015

(65) Prior Publication Data
US 2017/0199280 A1    Jul. 13, 2017

Related U.S. Application Data (60) Provisional application No. 62/140,250, filed on Mar. 30, 2015, provisional application No. 62/139,401, (Continued)

(51) Int. Cl.
*G01S 17/66* (2006.01)
*G01S 7/484* (2006.01)
(Continued)

(52) U.S. Cl.
CPC .............. *G01S 17/66* (2013.01); *F41G 3/145* (2013.01); *F41G 3/165* (2013.01); *F41G 7/226* (2013.01);
(Continued)

(58) Field of Classification Search
CPC .................................. G01S 7/484; G01S 7/4861
See application file for complete search history.

(56) References Cited

U.S. PATENT DOCUMENTS 4,003,659 A * 1/1977 Conard ................... F41G 7/30
                                                                244/3.11
6,323,941 B1 * 11/2001 Evans .................. G01S 17/023
                                                                250/339.02
(Continued)

FOREIGN PATENT DOCUMENTS

| EP | 2816309 A2 | 12/2014 |
|----|------------|---------|
| EP | 2816312 A2 | 12/2014 |
| FR | 2969305 A1 | 6/2012 |

OTHER PUBLICATIONS

Extended European Search Report for European Patent Application No. 16162704.7, dated Aug. 12, 2016.

*Primary Examiner* — Eric L Bolda
(74) *Attorney, Agent, or Firm* — Locke Lord LLP; Scott D. Wofsy; Judy R. Naamat (57) ABSTRACT

A method of identifying at least one target includes receiving a series of images over time of pulsed energy reflected from the at least one target, each image including a plurality of pulses related to different first and second pulse codes, detecting the pulses in an image of the received images, and outputting pulse detection information including XY coordinates and arrival time information associated with the respective detected pulses. The method further includes associating the pulse detection information with the first and second pulse codes based on the arrival time information, and generating output position information for the at least one target in space that indicates output positions for the at least one target based on the XY coordinates and being associated with the corresponding first and second pulse codes.

15 Claims, 4 Drawing Sheets

Related U.S. Application Data filed on Mar. 27, 2015, provisional application No. 62/139,371, filed on Mar. 27, 2015.

(51) Int. Cl.

| | |
|---|---|
| *G01S 7/486* | (2006.01) |
| *G01S 17/00* | (2006.01) |
| *G01J 1/02* | (2006.01) |
| *G01J 1/42* | (2006.01) |
| *F41G 7/22* | (2006.01) |
| *F41G 3/14* | (2006.01) |
| *G01J 1/44* | (2006.01) |
| *G01J 1/04* | (2006.01) |
| *F41G 3/16* | (2006.01) |

(52) U.S. Cl.
CPC .......... *F41G 7/2293* (2013.01); *G01J 1/0295* (2013.01); *G01J 1/0488* (2013.01); *G01J 1/44* (2013.01); *G01S 7/484* (2013.01); *G01S 7/4861* (2013.01); *G01S 17/003* (2013.01); *G01J 2001/4238* (2013.01)

(56) References Cited

U.S. PATENT DOCUMENTS

| | | |
|---|---|---|
| 7,773,202 B2 | 8/2010 | Crawford et al. |
| 8,378,279 B2 | 2/2013 | Mourar et al. |
| 8,451,432 B2 | 5/2013 | Crawford et al. |
| 8,462,323 B2 | 6/2013 | Markov et al. |
| 2010/0067608 A1* | 3/2010 | Tyree ............... F41G 7/2246 375/285 |
| 2012/0211665 A1* | 8/2012 | Cloud ............... G01S 7/4804 250/394 |
| 2012/0261553 A1* | 10/2012 | Elkind ............... H04N 5/335 250/208.1 |
| 2013/0153745 A1* | 6/2013 | Schmitt ............. G01S 17/66 250/203.2 |

\* cited by examiner

SYSTEM AND METHOD OF TRACKING MULTIPLE TARGETS DESIGNATED BY PULSE-CODED LASERS

CROSS-REFERENCE TO RELATED APPLICATIONS

The subject application claims the benefit of priority to U.S. Provisional Patent Application Ser. Nos. 62/139,401, filed on Mar. 27, 2015; 62/139,371, filed Mar. 27, 2015; and 62/140,250, filed Mar. 30, 2015, the disclosures of which are herein incorporated by reference in their entirety.

BACKGROUND OF THE INVENTION

1. Field of the Invention

The present disclosure relates to laser designation and, more particularly, to detection of pulse code signatures from pulsed laser designators.

2. Description of Related Art

A variety of devices and methods are known in the art for laser spot tracking. A traditional laser designation system includes a laser designator, which is used to illuminate or paint an object of interest. The laser designator emits laser pulses in a predetermined pulse train according to the setting as designated by the user. A tracking device can detect the laser spot and track it. Typical tracking devices have employed a set of four photo-diodes arranged in a quadrant configuration so that tracking feedback can be based on which quadrant receives the laser signal.

Such conventional methods and systems have generally been considered satisfactory for their intended purpose. However, there is still a need in the art systems and methods that allow for improved identification of targets, such as identification of a single target or multiple targets using multiple emitters. The present disclosure provides a solution for these problems.

SUMMARY OF THE INVENTION

A laser detection system includes an imager to receive a series of images over time of pulsed energy reflected from at least one target, each image including a plurality of pulses related to different first and second pulse codes, and a pulse detector to detect the pulses in an image of the received images and output pulse detection information including XY coordinates and arrival time information associated with the respective pulses detected in respective images. The laser detection system further includes a pulse tracker to associate the pulse detection information with the first and second pulse codes based on the time the arrival time information, and to generate output position information for the at least one target in space that indicates output positions for the at least one target based on the XY coordinates and being associated with the corresponding first and second pulse codes.

The output positions can indicate the positions of the at least one target over time. The output position information can be configured to be displayable on a display device. In embodiments, the laser detection system as recited in claim 1, wherein the imager is a short-wave infrared (SWIR) imager. In further embodiments, at least one of the pulse detector and the pulse tracker are implemented on a single integrated circuit.

The pulse tracker can include first and second pulse validators, wherein the pulse tracker can assign pulse detection information that is associated with the first pulse code to the first pulse validator and pulse detection information that is associated with the second pulse code to the second pulse validator.

The pulse tracker can include first and second pulse validators. Each of the first and second validators can be assigned a different ranking. If the pulse tracker recognizes pulse detection information that is associated with a certain pulse code for the first time, the pulse tracker assigns the lowest ranked validator of the first and second validators that is not yet actively tracking pulse detection information to actively track pulse detection information associated with the certain pulse code.

The pulse tracker can validate pulse detection information associated with a detected pulse based on whether a distance between the associated XY coordinates associated with the detected pulse is within a predetermined threshold value relative to pulse detection information associated with a previously received detected pulse having the same pulse code.

The pulse tracker can validate pulse detection information based on whether the arrival time information associated with the detected pulse is within a predetermined threshold value relative to the pulse detection information associated with the previously received detected pulse having the same pulse code.

The pulse detector pulse detection information output by the pulse detector can further include magnitude information associated with the respective pulses detected in respective images. The pulse tracker can validate the pulse detection information based on the pulse magnitude information associated with multiple received detected pulses having the same arrival time information.

If the pulse tracker determines that a predetermined number of pulses in the image are positioned within a predetermined distance from one another, the pulse tracker can generate position and pulse repetition interval information that correlates to a single pulse for the pulses determined.

In another aspect, a method of identifying at least one target includes receiving a series of images over time of pulsed energy reflected from the at least one target, each image including a plurality of pulses related to different first and second pulse codes. The method further includes detecting the pulses in an image of the received images and outputting pulse detection information including XY coordinates and arrival time information associated with the respective detected pulses. The method further includes associating the pulse detection information with the first and second pulse codes based on the arrival time information, and generating output position information for the at least one target in space that indicates output positions for the at least one target based on the XY coordinates and being associated with the corresponding first and second pulse codes.

The method can further include determining for respective pulses detected in the series of images whether the pulse detection information associated with the pulse is associated with the first pulse code or the second pulse code. The pulses detected in the series of images having pulse detection information associated with the first pulse code can be tracked in a first process, and the pulses detected in the series of images having pulse detection information associated with the second pulse code can be tracked in a second process that is different from the first process.

The method can further include determining whether a distance between the associated XY coordinates associated with the detected pulse relative to pulse detection information associated with a previously received detected pulse having the same pulse code is within a predetermined threshold value. If so, the method can include validating pulse detection information associated with the detected pulse.

The method can further include determining whether a time the arrival time information associated with the detected pulse is within a predetermined threshold value relative to the pulse detection information associated with the previously received detected pulse having the same pulse code. If so, the method can include validating pulse detection information associated with the detected pulse.

In embodiments, the method can include determining that at least a predetermined number of pulses in the image are positioned within a predetermined distance from one another, and generating position and pulse repetition interval information that correlates to a single pulse for the pulses determined.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
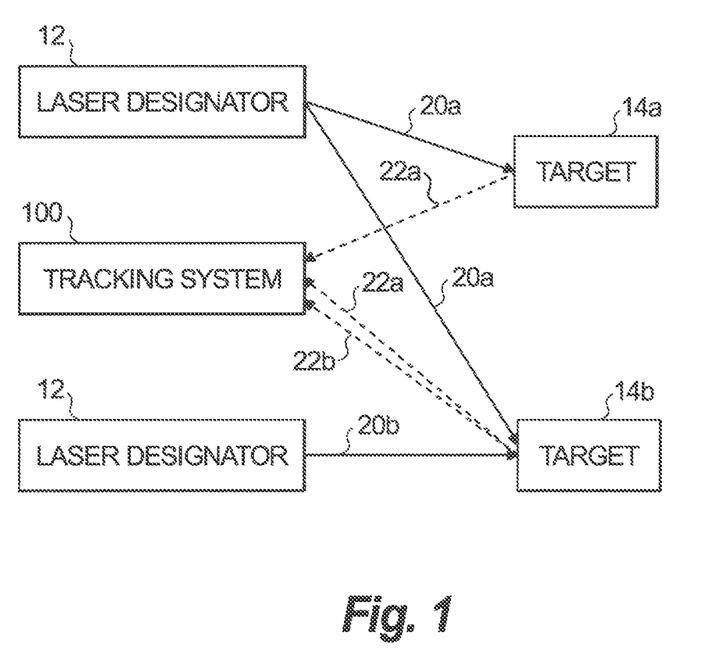
FIG. 1 is a schematic view of an exemplary embodiment of a laser designator pulse tracking system constructed in accordance with the present disclosure, showing a laser designator target.

Reference will now be made to the drawings wherein like reference numerals identify similar structural features or aspects of the subject disclosure. For purposes of explanation and illustration, and not limitation, a block diagram of an exemplary embodiment of a laser designator pulse tracking system in accordance with the disclosure is shown in FIG. 1 and is designated generally by reference character 100. Methods associated with operation of the laser designator pulse tracking system in accordance with the disclosure, or aspects thereof, are provided in FIGS. 2-3A and 3B, as will be described. The systems and methods described herein can be used to provide improved target tracking using pulse-coded lasers.

With reference to FIG. 1, laser designators 12 (including 12a and 12b) can illuminate or paint targets 14 (including 14a, 14b) with a pulse coded laser beam 20 (including 20a, 20b). In FIG. 1, the incident laser beam 20 is reflected from the target, as indicated by the dashed line designated by reference numeral 22 (including 22a, 22b) in FIG. 1. Laser designator pulse tracking system 100 receives a portion of the reflected laser from target 10. Respective laser designators 12 can pulse beams 20 with a predetermined code, and the pulses received by tracking system 100 can be processed to detect pulsed laser signatures as indicated by a pulse code, detect a target, identify the target using the laser signature, generate tracking information that tracks the target's position, and/or provide the tracking information to a person or system using tracking system 100.

The tracking system 100 can be implemented as a stationary or portable device, and can be provided on, for example an ordinance weapon such as a missile, or an airplane that fires the missile. A laser designator 12 can be disposed within a device that houses the tracking system 100. The tracking system 100 can be disposed, for example, in a short-wave infrared (SWIR) camera.

Each laser designator 12a and 12b emits a laser beam that has a pulse code associated with it. Each pulse is correlated to a pulse train having a pulse repetition frequency (PRF) that can be associated with the laser designator 12 that emitted the laser energy. Pulsed laser beams 20a are reflected from a first target 14a or a second target 14b as returns 22a. Pulsed laser beams 20b are reflected from the first target 14a or the second target 14b as return 22b. The tracking system 100 identifies the pulse code associated with received returns 22a and 22b, and determines and tracks the positions of the targets 14a and 14b.

Accordingly, tracking system 100 can receive laser beams 22a emitted from different laser designators 12 and reflected from different targets 14. In some instances a single target 14b can be illuminated by both laser designators 12a and 12b. In other instances, each target 14a, 14b is illuminated by only one of the laser designators 12a or 12b. The targets 14 and/or the tracking system 100 can be in motion. Tracking the target 14a and 14b therefore includes identifying the pulse code of the returns 22a and 22b, and tracking the positions of the targets 14a, 14b in streamed images in association with an identified pulse code, distinguishing targets 14a, 14b that are illuminated with laser beams having the same pulse code, and filtering out unwanted information.

Figure 2:
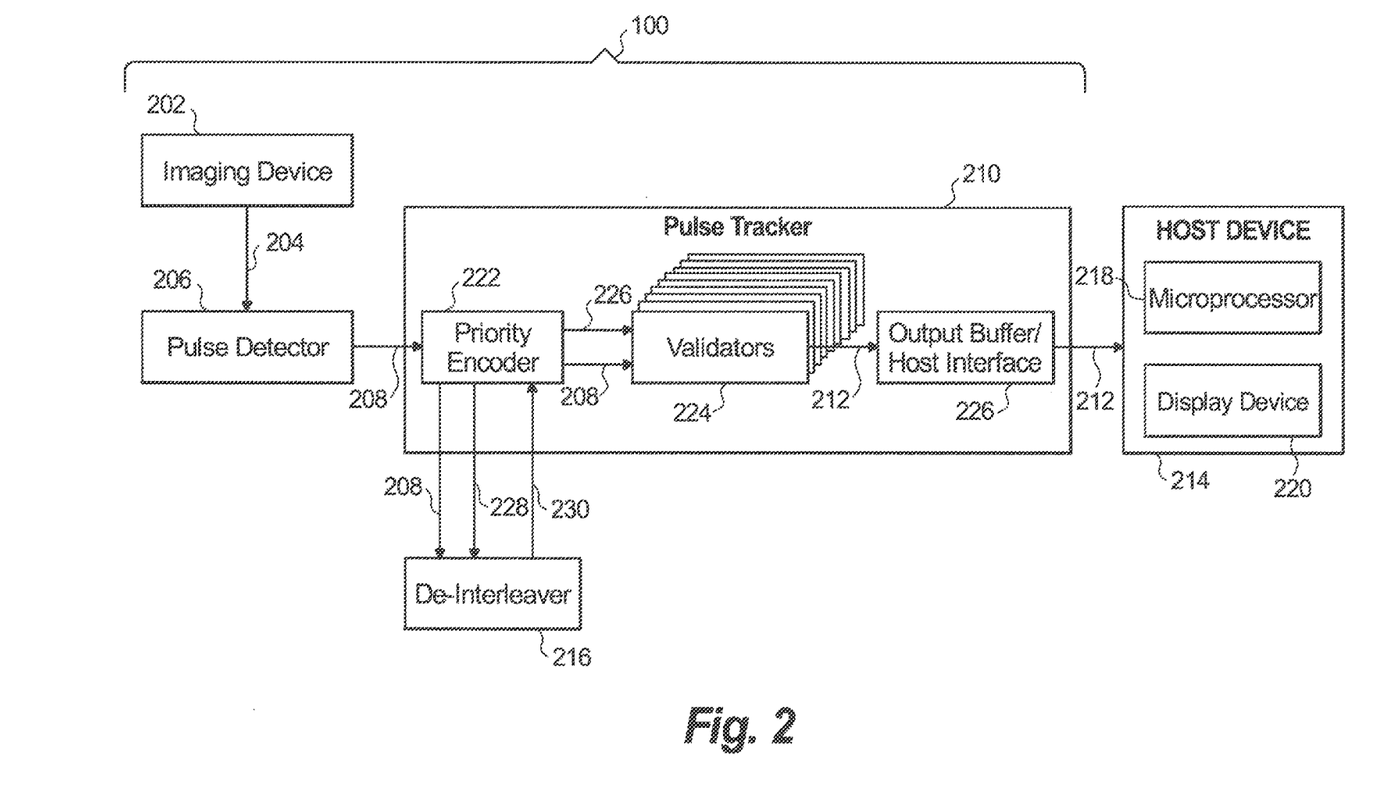
FIG. 2 is a block diagram of an exemplary embodiment of the laser designator pulse tracking system of FIG. 1, showing a pulse detector, a pulse tracker, and a pulse de-interleaver communicating with a host device.

With reference to FIG. 2, a block diagram of the tracking system 100 is shown. The tracking system 100 includes an imaging device 202 that detects reflected laser pulses and outputs corresponding digital video data 204, including a series of image frames and framing signals, to a pulse detector 206. The imaging device can be, for example, a SWIR imaging engine that receives reflected laser beams 22, detects laser energy, and outputs the digital video data 204 in which each pulse of detected laser energy is represented as one or more pixels in a two-dimensional image frame with associated energy information. The image frames can be, for example, 32×32 pixel images. The framing signals can define a framing scheme and synchronization of the imaging frames when output in a series. The frame rate can be, for example, 20000 frames per second, however the disclosure is not limited thereto.

The pulse detector 206 receives and processes the video data 204 and outputs pulse detection information (PDI) 208 that includes the position of each pulse detected in an image frame, e.g., described in XY coordinates, a time of arrival (TOA) of the pulse, and magnitude (e.g., an energy level) associated with pulses detected in each image frame of the video data 204. In an embodiment, the PDI 208 is output as a pulse detector word (PDW) that includes the XY coordinate data and the energy level information related to individual pulses detected in the image frames. When an image frame includes more than one pulse, the pulse detector 206 generates PDI 208 for each pulse. The PDI 208 can be transmitted by the pulse detector 206 as a series of PDWs.

The tracking data 212 can include emitter data words (EDW) that include the position of the pulse in an image frame e.g., described in XY coordinates, and an indicator of an identified pulse code associated with the pulse. The pulse code identified can be, for example, a pulse repetition frequency code recognized and used by countries participating in the North Atlantic Treaty Organization (NATO), wherein in pulses having a particular repetition frequency code are identified by a unique NATO code.

The pulse tracking information 212 can be suitable for tracking the position of pulses having the same pulse code, wherein the tracking can track movement of a target being illuminated by pulses having a particular code. In addition, the tracking can further compensate for movement of tracking system 100. Additionally, the tracking information 212 can be suitable for display on a display device to enable visual tracking of the detected pulses.

The host device 214 can be provided, for example, in a command control center to send commands to an aircraft or a missile, in an aircraft, or in a missile. The host device 214 includes a microprocessor 218 that can request tracking information, format the tracking information, e.g., into ASCII encoded text stream that can be transmitted to a user, e.g., via a serial output interface. The host device 214 can also include a display device 220 that can display the tracking information for visual tracking of the detected pulses. The host device 214 and/or the display device 220 can be provided in the same device as the tracking system 100 or as one or more separate devices.

The pulse tracker 210 can recognize when pulse detection information 208 includes data relating to multiple pulses that are were detected within a selectable window of time and may be interleaved. The pulse tracker 210 can request that de-interleaver 216 de-interleave pulses that are closely spaced in time and filter out unwanted pulse information.

The pulse detector 206, pulse tracker 210, and de-interleaver 216 can be implemented using one or more processing devices or processing units, including one or more of a microcontroller, microprocessor, field programmable arrays (FPGA), application specific integrated circuit (ASIC), or the equivalent, without limitation thereto. In the present example, the pulse detector 206 and pulse tracker 210 are implemented using a single FPGA and the de-interleaver 216 is implemented using a microcontroller 218.

Figure 3A:
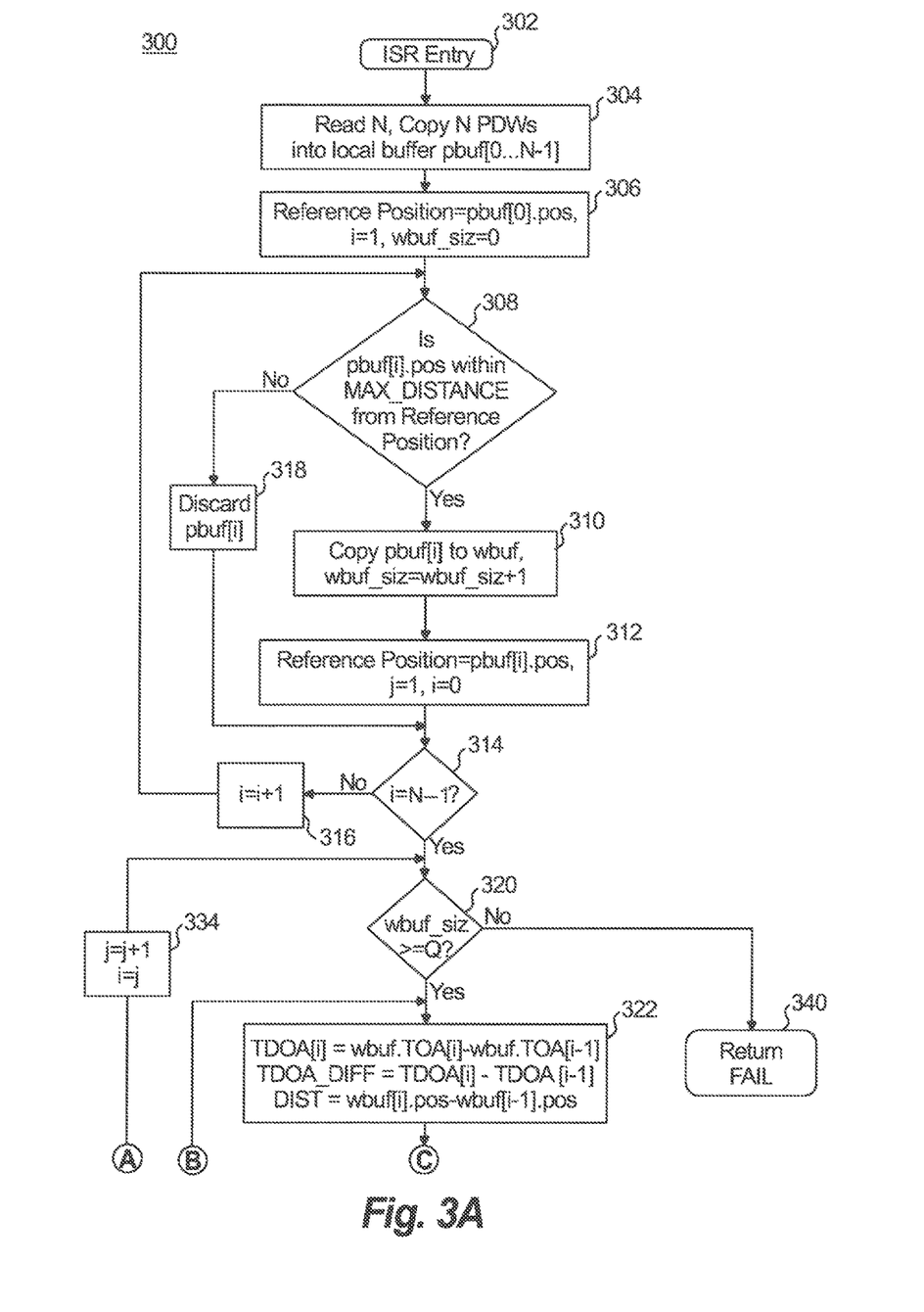
FIGS. 3A and B are a flowchart of an exemplary method of operation of the pulse de-interleaver of FIG. 2.
Figure 3B:
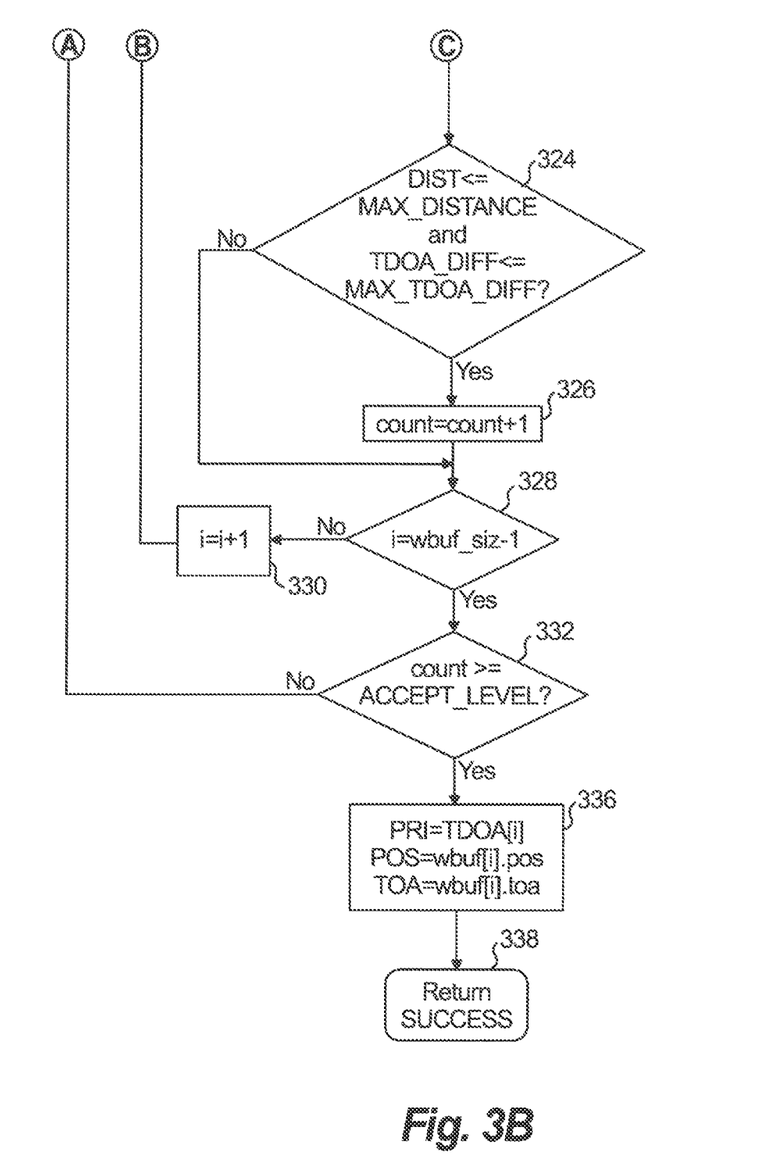

In embodiments, the de-interleaver 216 can be implemented as a microprocessor. The validators 224 can request a de-interleaver 216 process, such as by interrupting the de-interleaver 216. In one example, the validators 224 can jointly accept or reject a newly arrived pulse. A validator 224 only accepts the new pulse if the new pulse fits within a proximity sphere (described further below), associated with the validator, of a pulse train currently being tracked by that validator 224. If none of the validators 224 accept the new pulse, then the new pulse is added to a queue (e.g., stored in pbuf, described below in reference to FIG. 3) for de-interleaving.

The pulse tracker 210 includes a priority encoder 222, a plurality of validators 224, and an output buffer/host interface 226 that can use a time sequence algorithm to track multiple simultaneous pulse trains. The priority encoder 222 receives the PDI 208, filters unwanted pulses, and assigns a validator 224 to process the detected pulses described in the PDI 208. In embodiments, the priority encoder 222 can detect interleaving of detected pulses described in the PDI 208 and request de-interleaving when interleaving is detected.

The pulse tracker 210 includes two or more validators 224. In the present example, the pulse tracker 210 includes nine validators 224 that are assigned numbers V0-V8. However, in many applications, two or three validators 224 can be used. The validators are ranked in an order that corresponds to their assigned numbers, with V0 being ranked the lowest. The respective validators 224 can be assigned an idle state, acquisition state, or tracking state. At system startup all of the validators are in the idle state. A proximity sphere is determined for each validator 224 once the validator 224 enters the tracking state. The proximity sphere is defined by the X and Y locations and differences between TOA of pulses that are already assigned to the validator 224. The proximity sphere represents a pulse train. Accordingly, pulses that have nearly the same PDI and position may belong to the same pulse train and are assigned to the same validator 224.

When the priority encoder 222 receives a pulse, it can determine whether a filter operation should be performed, as described further below. A pulse that does not need to undergo a filter operation may be ready to be accepted by a validator 224. Assigning a pulse to a validator 224 includes determining whether the pulse belongs to a proximity sphere associated with a validator 224 that is already in the tracking state. The priority encoder 220 treats pulses that belong to pulse trains that are already being tracked with a higher priority than other pulses.

In alternative embodiments, detection of interleaving of pulses can be determined by the priority encoder 222 before assigning a pulse to a validator 224, or by a validator 224 assigned a pulse before the validator accepts the pulse for acquisition and/or tracking.

When a validator 224 is assigned its first pulse, the validator 224 transitions from the idle state to the acquisition state. In an embodiment in which the validator 224 detects a need for de-interleaving, when the validator 224 receives a threshold number (e.g., two or more) of pulses from the different laser designators 12 within a predetermined time threshold, the pulses may be determined to be interleaved, meaning that it is not known how many different pulse trains may need to be tracked and which pulse train each of the received pulses may belong to.

In accordance with an embodiment, at a pre-acquisition stage, for a predetermined interval of time sufficient to include at least 3 pulses at the lowest PRF, the validator 224 compares the XY coordinates of each pulse received. For each pulse which has XY coordinates within a threshold distance of the first pulse received, the validator 224 stores the pulse's TOA and XY coordinates in a de-interleaver buffer. If fewer than 3 pulses have been stored in the de-interleaver buffer within the predetermined interval of time, the validator 224 transitions back to the idle state. Otherwise the validator 224 sends an interrupt to the de-interleaver 216 and waits for a de-interleaving result.

Upon completion of performing a de-interleaver operation, the de-interleaver 216 returns either success 338 or fail 340 status. If the de-interleaver 216 returns fail 330, the validator 224 transitions back to the idle state. Otherwise the validator receives XY coordinate, TOA, and pulse repetition interval (PRI) of the de-interleaved pulse train from the de-interleaver 216, and transitions from the acquisition state to the tracking state. Once in the tracking state, the validator 224 can continue to track pulses received from a particular laser designator 12. The validators 224 determine whether a new pulse assigned to the validator 224 satisfies a condition established by a position gate that defines a selectable change in position threshold relative to the previously received pulse, and a condition established by a PDI gate that defines a selectable timing threshold for differences between TOA relative to the previously received pulse. If the newly received pulse does not satisfy the conditions, the pulse is potentially the start of a new pulse train and so is assigned to the lowest ranked validator 224 that is still in the idle state.

Accordingly, the validator 224 can validate the PDI associated with a detected pulse based on whether a distance between the associated XY coordinates associated with the detected pulse is within a predetermined threshold value relative to pulse detection information associated with a previously received detected pulse having the same pulse code. Additionally, or alternatively, the validator 224 can validate the PDI associated with a detected pulse based on whether a TOA associated with the detected pulse is within a predetermined threshold value relative to the pulse detection information associated with the previously received detected pulse having the same pulse code.

The validator 224 is programmed to allow a selectable (e.g., programmable) number of missed pulses when tracking a pulse train. However, if a programmable threshold of number of missed pulses is exceeded, the pulse train is dropped and the validator 224 transitions back to the idle state. Accordingly, the validator 224 is robust in that it will not drop a pulse train due to a minor incident, such as a single missed pulse.

A validator 224 that is in the acquisition stage does not accept PDI for pulses that are disposed within a sphere associated with a validator 224 that is already in the tracking state. Rather, such pulses are filtered out by a validator 224 in the acquisition stage so that a validator 224 in the acquisition stage will not respond to pulses that belong to pulse trains being handled by validators 224 that are already in the tracking stage.

The priority encoder 222 can filter unwanted pulses, such as may occur in certain field conditions that cause multiple laser beam emissions from the same laser designator 12 at the same or within a predetermined time threshold. When the priority encoder 222 receives a threshold number (e.g., two or more) of pulses from the same laser designator 12 that have different magnitudes simultaneously or within a predetermined time threshold, the priority encoder 222 designates the pulse that has the greatest magnitude as ready to be assigned to a validator 224 and discards the other pulses.

With reference to FIGS. 3A and 3B, a flowchart 300 is provided that shows a method of operation performed by the de-interleaver 216. At operation 302, an interrupt is received, which is indicated to be an interrupt service routine (ISR) entry. At operation 304, a variable N is read, and a list of N PDWs (associated with N pulses) that are to be processed for de-interleaving are retrieved from the de-interleave buffer into which they were previously put by the validator 224 and copied into a local buffer pbuf[0 . . . N−1].

At operation 306, a reference position is established to be the first position (e.g., the XY coordinates) of the first PDW in the local buffer, pbuf. The index i is set to 1, and the size of a work buffer, wbuf, is initialized to zero. At operation 308, a determination is made whether the position provided in the PDW, pbuf[i].pos, is within a distance threshold established by a programmable variable MAX_DISTANCE from the reference position. Only the PDWs that are within the distance threshold are retained in the local buffer, pbuf. The PDWs that exceed the distance threshold are filtered out and are not further processed.

Accordingly, if the determination at operation 308 is positive, then at operation 310, the reference position is set equal to the position of the ith PDW in pbuf, and the j PDWs remaining in the local buffer pbuf are copied into the working buffer wbuf. Additionally, the size of the work buffer wbuf is incremented by one. The reference position is set to pbuf[i].pos, the index j is initialized to 1, and the index i is set to 0. The method continues at operation 314.

At operation 314, a determination is made whether i=N−1. If the determination at operation 314 is negative, then at operation 316, the index i is incremented by one, and the method continues at operation 308. If the determination at operation 314 is positive, the method continues at operation 320.

If the determination at operation 308 is negative, the method continues at operation 318. At operation 318, the PDW stored at pbuf[i] is discarded, after which the method continues at operation 314.

At operation 320, a determination is made whether there are at least Q pulses in the working buffer wbuf (e.g., whether wbuf_size≥Q) If the determination at operation is positive, the method continues at operation 322.

At operation 322, a difference in time of arrival (TDOA) associated with a first PDW wbuf [i] is determined by determining a difference in TOAs for the first PDW and a second PDW wbuf [i+1], wherein the first and second PDWs are consecutive. A difference between the TDOA associated with the first and second PDWs is determined. A distance DIST is determined to be the difference in XY position between the first and second PDWs.

At operation 324, a determination is made whether the distance DIST does not exceed the distance threshold MAX_DISTANCE and the difference between TDOAs does not exceed a time difference threshold MAX_TDOA_DIFF. If the determination at operation 324 is positive, the method continues at operation 326. At operation 326, a counter is incremented, e.g., only if the condition at operation 324 is satisfied, and the method continues at operation 328. If the determination at operation 324 is negative, the method skips operation 326 and continues at operation 328. If the determination at operation 328 is positive, the method continues at operation 332.

At operation 328, a determination is made whether i=wbuf_size−1. If the determination at operation 328 is negative, the operation continues at operation 330. At operation 330, the index i is incremented by one, and the method continues at operation 322.

At operation 330, the index i is incremented and operations 322-328 are repeated in order to count the amount of consecutive pairs of PDWs in wbuf having a difference between TDOAs and a difference in positions that do not exceed respective thresholds. Operations 322-330 are performed in a loop to test for the existence of a pulse train starting with pulse j of wbuf.

When that loop ends, a determination is made at operation 332 whether count exceeds ACCEPT_LEVEL. If the determination at operation 332 is negative, this indicates that there were not enough pulses to form a pulse train and the method advances to operation 334 in which variable j is incremented to select a next pulse of in the sequence of PDWs stored in wbuf, followed by operation 320. Operation 320 is repeated in an outer loop, after which the inner loop including operations 322-330 is repeated. The outer loop, including operations 320, the inner loop, operation 332, and operation 334, is repeated until a pulse train is identified at operation 332 or there are not enough pulses left to consider, as determined at operation 320.

Once the determination at operation 332 is positive, the method continues at operation 336. At operation 336, the output values for the detected pulse train are determined, including TOA=wbuf[i].toa, PRI=TDOA[i], and the XY coordinates for the position POS=wbuf[i].pos, wherein wbuf[i].toa indicates the TOA for the ith PDW in wbuf, and wbuf[i].pos indicates the XY coordinates for the ith PDW in wbuf. At operation 338, a SUCCESS status value is returned with the TOA, PRI, and POS values determined at operation 336. If the determination at operation 320 is negative, an insufficient number of PDWs were stored in the local buffer, pbuf, or the working buffer, wbuf, and control returns to the validator 224 that initiated the interrupt with a return status value of FAIL.

Accordingly, if the de-interleaver 216 is activated to determine which pulse to use for position, TOA and TDOA information, the de-interleaver can detect for a predetermined number of pulses in the image that are positioned within a predetermined distance from one another, a position and PRI that correlates to a single selected pulse and output that pulse to be used for the two or more pulses.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Aspects of the present disclosure are described below with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be implemented in hardware, firmware, or software that can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A potential advantage to using the tracking system 100 is that multiple targets can be detected, identified, and tracked using one or more laser designators and associated pulse codes. Additionally, a single target can be tracked using multiple laser designators and associated pulse codes.

While shown and described in the exemplary context of detecting, identifying, and tracking targets for aircraft related applications, those skilled in the art will readily appreciate that the tracking system 100 in accordance with this disclosure can be used in any other suitable application.

The methods and systems of the present disclosure, as described above and shown in the drawings, provide for a tracking system with superior properties including the ability to simultaneously detect, identify, and track multiple targets using a single laser designator using a single pulse code or multiple laser designators having associated same or different pulse codes. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A laser detection system comprising:
   an imager to receive a series of images over time of pulsed energy reflected from at least one target, each image including a plurality of pulses related to different first and second pulse codes;
   a pulse detector to detect the pulses in an image of the received images and output pulse detection information including location in the image information and arrival time information associated with the respective pulses detected in respective images;
   a pulse tracker to associate the pulse detection information for respective pulses in the image with the first and second pulse codes based on the location in the image information and the arrival time information associated with the respective pulses, to select pulses of the detected pulses to be deinterleaved, selection of the pulses being based on position in image information and arrival time information associated with the respective pulses selected to be deinterleaved, and to generate output position information for the at least one target in space that indicates output positions for the at least one target based on the location in the image information and being associated with the corresponding first and second pulse codes.

2. The laser detection system as recited in claim 1, further comprising a deinterleaver to deinterleave pulses based on position in image information and arrival time information associated with the pulses selected to be deinterleaved relative to at least one other pulse selected to be deinterleaved.

3. The laser detection system as recited in claim 1, wherein the imager is a short-wave infrared (SWIR) imager.

4. The laser detection system as recited in claim 1, wherein at least one of the pulse detector and the pulse tracker are implemented on a single integrated circuit.

5. The laser detection system as recited in claim 1, wherein the pulse tracker includes first and second pulse validators, wherein the pulse tracker assigns pulse detection information that is associated with the first pulse code to the first pulse validator and pulse detection information that is associated with the second pulse code to the second pulse validator.

6. The laser detection system as recited in claim 1, wherein the pulse tracker includes first and second pulse validators, each of the first and second validators being assigned a different ranking, wherein if the pulse tracker recognizes pulse detection information that is associated with a certain pulse code for the first time, the pulse tracker assigns the lowest ranked validator of the first and second validators that is not yet actively tracking pulse detection information to actively track pulse detection information associated with the certain pulse code.

7. The laser detection system as recited in claim 1, wherein the pulse tracker validates pulse detection information associated with a detected pulse based on whether a distance between the associated location in the image information associated with the detected pulse is within a predetermined threshold value relative to a reference position.

8. The laser detection system as recited in claim 7, wherein the pulse tracker validates pulse detection information based on whether the arrival time information associated with the detected pulse is within a predetermined threshold value relative to the pulse detection information associated with a previously received detected pulse having the same pulse code.

9. The laser detection system as recited in claim 7, wherein the pulse detector pulse detection information output by the pulse detector further includes magnitude information associated with the respective pulses detected in respective images, wherein the pulse tracker validates the pulse detection information based on the pulse magnitude information associated with multiple received detected pulses having the same arrival time information.

10. The laser detection system as recited in claim 1, wherein if the pulse tracker determines that a predetermined number of pulses in the image are positioned within a predetermined distance from one another, the pulse tracker generates position and pulse repetition interval information to be used for the predetermined number of pulses as if it were a single pulse.

11. A method of identifying at least one target comprising:
receiving a series of images over time of pulsed energy reflected from the at least one target, each image including a plurality of pulses related to different first and second pulse codes;
detecting the pulses in an image of the received images;
outputting pulse detection information including location in the image information and arrival time information associated with the respective detected pulses;
associating the pulse detection information for respective pulses in the image with the first and second pulse codes based on the location in the image information and the arrival time information associated with the respective pulses, to select pulses of the detected pulses to be deinterleaved, selection of the pulses being based on position in image information and arrival time information associated with the respective pulses selected to be deinterleaved; and
generating output position information for the at least one target in space that indicates output positions for the at least one target based on the location in the image information and being associated with the corresponding first and second pulse codes.

12. The method as recited in claim 11, further comprising:
determining for respective pulses detected in the series of images whether the pulse detection information associated with the pulse is associated with the first pulse code or the second pulse code;
tracking the pulses detected in the series of images having pulse detection information associated with the first pulse code in a first process; and
tracking the pulses detected in the series of images having pulse detection information associated with the second pulse code in a second process that is different from the first process.

13. The method as recited in claim 11, further comprising:
determining whether a distance between the associated location in the image information associated with the detected pulse relative to a reference position is within a predetermined threshold value; and
if so, validating pulse detection information associated with the detected pulse.

14. The method as recited in claim 11, further comprising:
determining whether a time the arrival time information associated with the detected pulse is within a predetermined threshold value relative to the pulse detection information associated with a previously received detected pulse having the same pulse code; and
if so, validating pulse detection information associated with the detected pulse.

15. The method as recited in claim 11, further comprising:
determining that at least a predetermined number of pulses in the image are positioned within a predetermined distance from one another; and
generating position and pulse repetition interval information to be used for the predetermined number of pulses as if it were a single pulse.

* * * * *